July 21, 1953 A. C. BARLOW ET AL 2,646,380
METHOD OF MOLDING THERMOSETTING SYNTHETIC RESIN MATERIALS
Filed Aug. 28, 1950
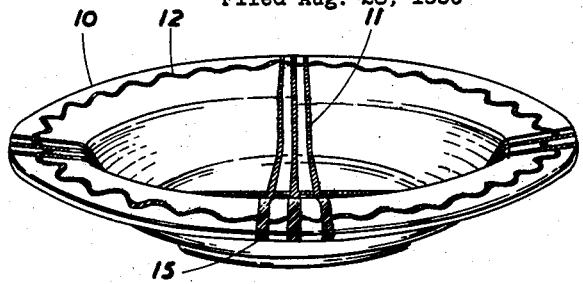
FIG. 1
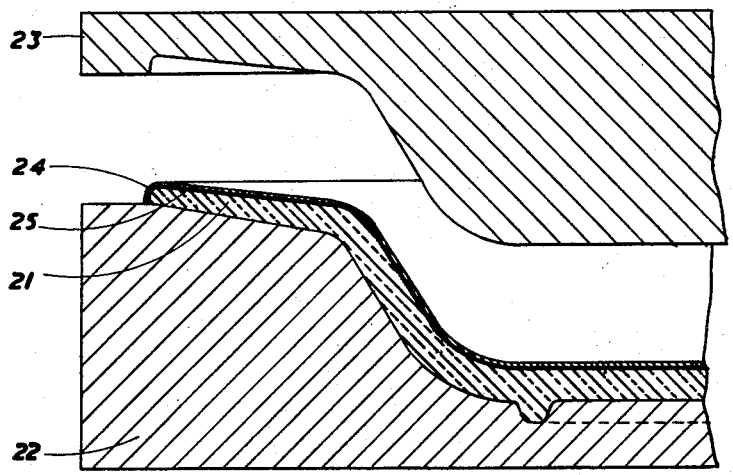
FIG. 3
FIG. 2.
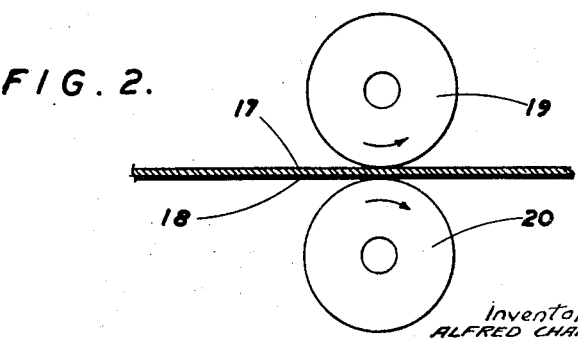
Inventors
ALFRED CHARLES BARLOW,
WILLIAM GEORGE DAVID CARPENT,
JAMES BRISBANE CAMERON,
JOHN MATTHIAS GRIFFITH,
BY Robert B Larson
Attorney Patented July 21, 1953

2,646,380

UNITED STATES PATENT OFFICE 2,646,380

METHOD OF MOLDING THERMOSETTING SYNTHETIC RESIN MATERIALS

Alfred Charles Barlow, Parkway, Hillingdon, William George David Carpenter, Hayes, James Brisbane Cameron, Hounslow, and John Matthias Griffith, Isleworth, England, assignors to The Fairey Aviation Company Limited, Hayes, England Application August 28, 1950, Serial No. 181,916
In Great Britain July 12, 1950

5 Claims. (Cl. 154—100)

This invention relates to an improved method of moulding thermosetting synthetic resin moulding powders, and in particular is concerned with the planographic production of designs on the surface of moulded articles during moulding. The application of a design by transfer or by printing on the surface of an article moulded from a synthetic resin is unsatisfactory, particularly when the article is required during its useful life to undergo changes of temperature or abrasion or repeated washing, since the design sooner or later wears or peels away. It is an object of the invention to provide a method whereby designs may be cheaply and easily applied during moulding, in any desired colour or combination of colours in such a way that the design is as durable and resistant to deterioration as the article itself.

One such method has been proposed in British Patent No. 605,643, filed January 1, 1946, granted to Ashdowns Ltd., Graham Faulkner Bassett and Charles Lomas, and is characterised in that the article is preformed by subjecting the quantity of thermosetting plastic material requisite to form the article to heat and pressure such that the material assumes the shape of the article to be produced, but is still capable of bonding with a further quantity of the moulding material, the heat and pressure applied during this moulding stage being insufficient to cure the plastic, a flexible decorated sheet having a dry coat of thermosetting resin material is applied to the partially cured moulded article with the decorated face of the sheet away therefrom, a coating being thereby interposed, and the assembly is subjected to heat and pressure in a final moulding stage to effect curing, whereby the decorated sheet becomes an integral part of the article.

We have found that success is dependent on several critical factors, of which the chief are the thickness of the paper employed and the degree of impregnation of the paper. Due regard must be had to the resin content of the impregnated paper if stability of the applied design is to be maintained during the final curing, but at the same time the resin in the paper after impregnation thereof must have sufficient flow to effect a satisfactory union with the preform. There are also involved other factors, which will become apparent from the following description.

According to the invention, the method of moulding an article from a thermosetting moulding powder comprises applying the required design to absorbent paper of a thickness of 1.5–7.0 thousandths of an inch, impregnating the decorated paper with a synthetic resin varnish of the same or similar type as the thermosetting moulding powder, passing the impregnated paper between rolls to remove excess resin, drying the impregnated paper, moulding the article, opening the mould before curing is completed, applying the impregnated sheet to the surface to be decorated, replacing the article in the mould, completing the curing of the article, and removing the moulding.

Preferably the impregnated sheet is applied with the decorated side towards the moulded article, the design being arranged as a mirror image of what is to be seen on the finished product. Preferably also lithopone loaded papers and other highly pigmented papers are avoided; the paper employed should be one that will become substantially transparent after impregnation, and a long-fibred paper having a high wet strength is also to be preferred.

The decorated paper may be impregnated with the same type of resin as the thermosetting material. For example, a phenol-formaldehyde resin varnish is used with phenol-formaldehyde moulding composition, a melamine-formaldehyde resin varnish with a melamine-formaldehyde moulding composition, and so on.

If the time normally required for full thermosetting of the impregnated paper is in excess of that normally required for the moulding composition, the paper is preheated to such an extent as to reduce its curing time to somewhat less than that of the moulding composition. This reduced curing time is related to the sequence of steps in the method in that the mould is opened and the paper applied at such a time that the remaining time required to cure the moulded article is equal to the reduced curing time of the paper.

If necessary, the moulding may be completely removed from the mould for the application of the paper, and subsequently replaced in the mould for the remainder of the cure.

Preferably the resin content of the impregnated paper is 50–60%.

Printing of the design on the paper may be by any convenient known method, either in monochrome or multicolour, such as offset litho, ordinary litho, letterpress, or by handpainting.

Alternatively, the design may be applied to the paper by a hand process such as painting or transfer with a suitable pigment or ink, or by hand printing. One example will be described with reference to the accompanying drawings in which:

Figure 1 is a perspective view of a decorated plate,

Figure 2 is a diagrammatic sectional elevation of impregnated paper being passed between stainless steel rollers, and Figure 3 is a fragmentary diagrammatic sectional elevation of a partly cured plate in a mould.

In this example, it was desired to mould a 10" diameter dinner plate 10 with a melamine formaldehyde moulding powder, incorporating a coloured design on the rim and center of the plate.

The paper used was comprised of 50% cotton, 25% hemp, and 25% linen fibre, and was 1.9 thousandths of an inch thick, and had a substance of 34 grms. per sq. metre. This paper has a good absorbency and high wet strength, and is capable of forming a transparent or nearly transparent film after impregnation and moulding. The paper was printed with the design, using oil-bound, slow-drying lithographic ink. When the ink had thoroughly dried, the paper was impregnated with a melamine formaldehyde resin solution of the following composition,

| | Percent by weight |
|---|---|
| Resin | 60 |
| Water | 30 |
| Industrial spirit | 10 |

The resin was placed in a flat trough, and the printed sheets were immersed in it long enough for complete impregnation to take effect. The impregnated paper 17, bearing the printed design 18, was then passed between stainless steel rollers 19, 20, as shown in Figure 2, set to 0.005" and allowed to air dry. By this means the resin content of the paper was brought to the required figure. A cured resin content of 50–60% has been found to be the most satisfactory. Below this, the paper is starved of resin, while above it excessive resin causes the printing ink to flow with the resin, resulting in blurring of the finished design. The resin content is advantageously adjusted by the setting of the gap of the steel rollers. Drying can be carried out at room temperature or at elevated temperatures up to a maximum of 100° C. It is necessary to balance out drying time with temperature so that sufficient flow remains and so that it will still become tacky and stick to the moulding to which it is applied. The most satisfactory results were obtained at a temperature of 80° C. drying for 10 minutes. After thorough drying the designs were cut to shape, removing excess paper. The resin on the paper was capable of curing to completion in two minutes at a temperature of 150° C.

A flash type mould having cooperating parts 22, 23 for the dinner plate was set up in a compression press supplying a total pressure of 100 tons and heated to a temperature of 150° C. Sufficient melamine formaldehyde moulding powder to mould a plate without excessive flash was introduced into the mould. The mould was rapidly closed and pressure applied for a period of thirty seconds, when the mould was again opened to allow the design to be applied. This stage of the method is shown in Figure 3. The partly cured plate 21 is shown in position in the mould, and a strip 24 of impregnated paper bearing a design indicated at 25 was laid upon it in the desired position, while it was still hot, with the design side 25 against the moulding 21, and the mould again closed and pressure applied. After a further two minutes, cure was complete, the press opened and the moulding incorporating the design removed.

The only subsequent operation was that of deflashing. It will be seen that a dinner plate 10 having compound curvature over various surfaces may be decorated with a design which lies on both flat and curved surfaces. For example, the plate shown in Figure 1 has an annular design around the rim, indicated at 12, combined with a radial design indicated at 11 extending over the raised lip of the plate as at 15. It will be obvious that the exact shape of each piece of impregnated paper will depend on the design to be applied, several pieces of paper being arranged adjacent one another if required.

Articles moulded in accordance with the invention are marked with a planographic design that will resist normal abrasive wear to the same extent as will the actual moulded article itself, and will withstand repeated washing, e. g. in hot water and cleansing agents.

We claim:

1. A method of applying a design to an article during the moulding of the article from a thermosetting moulding powder, comprising, applying the required design to absorbent paper of a thickness of 1.5 to 7.0 thousandths of an inch, impregnating the decorated paper with a synthetic resin varnish of the same group as the thermosetting moulding powder, passing the impregnated paper between rolls and thereby removing excess resin, drying the impregnated paper, moulding the article, opening the mould before curing is completed, applying the impregnated sheet to the surface to be decorated with the decorated side of said sheet toward the moulded article, completing the curing of the article, and removing the moulding.

2. A method of moulding an article as claimed in claim 1, wherein the paper is preheated to such an extent as to reduce its curing time to somewhat less than that of the moulding powder.

3. A method of moulding an article as claimed in claim 1, wherein the resin content of the impregnated paper is 50–60%.

4. A method of moulding an article as claimed in claim 1, wherein the excess resin is removed from the impregnated paper by passing it between parallel rolls.

5. A method of moulding an article as claimed in claim 1, wherein the design is applied to the paper by printing.

ALFRED CHARLES BARLOW.
WILLIAM GEORGE DAVID CARPENTER.
JAMES BRISBANE CAMERON.
JOHN MATTHIAS GRIFFITH.

References Cited in the file of this patent

UNITED STATES PATENTS

| Number | Name | Date |
|---|---|---|
| 1,301,069 | MacDonald | Apr. 15, 1919 |
| 1,454,845 | Clay | May 15, 1923 |
| 1,742,516 | Mills | Jan. 7, 1930 |
| 1,863,239 | Cochrane | June 14, 1932 |
| 2,169,825 | Warren | Aug. 15, 1939 |
| 2,523,234 | Rado | Sept. 19, 1950 |

FOREIGN PATENTS

| Number | Country | Date |
|---|---|---|
| 605,643 | Great Britain | July 28, 1948 |